United States Patent
Aubry et al.

(10) Patent No.: US 7,757,602 B2
(45) Date of Patent: Jul. 20, 2010

(54) PRODUCT DE-TOPPER

(76) Inventors: Larry Aubry, 15N015 Red Barn Rd., Hampshire, IL (US) 60140; Joe Zabala, 11 Rock River Ct., Algonquin, IL (US) 60102; Arkadiusz Grudzien, 5100 Chambers Dr., Hoffman Estates, IL (US) 60010

( * ) Notice: Subject to any disclaimer, the term of this patent is extended or adjusted under 35 U.S.C. 154(b) by 751 days.

(21) Appl. No.: 11/580,322

(22) Filed: Oct. 13, 2006

(65) Prior Publication Data

US 2007/0084698 A1 Apr. 19, 2007

Related U.S. Application Data (60) Provisional application No. 60/726,906, filed on Oct. 14, 2005.

(51) Int. Cl.
*B65B 25/16* (2006.01)
(52) U.S. Cl. .......................... 99/450.4; 99/409; 99/537; 198/412
(58) Field of Classification Search ................ 99/450.4, 99/409, 537, 355; 198/407, 409, 412, 416; 209/651, 653; 414/797.2
See application file for complete search history.

(56) References Cited

U.S. PATENT DOCUMENTS

| | | |
|---|---|---|
| 1,766,450 A | 6/1930 | Ost |
| 2,235,546 A | 3/1941 | Ahrndt |
| 2,669,269 A | 2/1954 | Schmidt |
| 2,686,542 A | 8/1954 | Schmidt |
| 2,979,095 A | 4/1961 | Jovis |
| 3,192,975 A | 7/1965 | Noel |
| 3,192,976 A | 7/1965 | Clock |
| 3,266,442 A | 8/1966 | Udall et al. |
| 3,669,165 A | 6/1972 | Tobey et al. |
| 3,692,077 A | 9/1972 | Noel |
| 3,733,942 A | 5/1973 | Noel |
| 3,737,084 A | 6/1973 | Noel |

(Continued)

FOREIGN PATENT DOCUMENTS

GB 1096283 12/1967

OTHER PUBLICATIONS

Planet Products Corp., "Breakfast Sandwich Assembly," On-line Brochure & Video, Aug. 2005, http://www.planet-products.citymaker.com/f/breakfast_sandwich.swf.

*Primary Examiner*—Douglas A Hess
(74) *Attorney, Agent, or Firm*—David A. Gottardo, Atty at Law (57) ABSTRACT

The present invention relates to equipment for assembling food products, and more specifically to an apparatus and method for separating or parting stacked food products during a food production process. The invention, a de-topper, facilitates the desired parting or separation of stacked products having at least upper and lower sections defining a separation line. In parting stacked products along the separation line, the de-topper comprises a longitudinal arm and at least one primary conveying path for conveying the at least upper and lower sections of the stacked products towards the arm. A drive reciprocates the arm so that the reciprocating arm sweeps the upper sections of the stacked products from the at least one primary conveying path and onto a secondary conveying path, located outwardly thereof. The lower and upper sections are thereafter conveyed on the respective primary and secondary conveying paths away from the reciprocating longitudinal arm.

28 Claims, 7 Drawing Sheets

U.S. PATENT DOCUMENTS

| | | | |
|---|---|---|---|
| 3,762,306 A * | 10/1973 | Staples | 99/450.4 |
| 3,923,148 A | 12/1975 | Dorner | |
| 4,015,492 A | 4/1977 | Terragnoli | |
| 4,237,763 A | 12/1980 | Chipchase | |
| 4,287,801 A | 9/1981 | Hanson | |
| 4,421,222 A | 12/1983 | Stuermer | |
| 4,497,233 A | 2/1985 | Papalexis et al. | |
| 4,630,725 A | 12/1986 | Stuermer | |
| 4,677,888 A | 7/1987 | Terragnoli | |
| 4,789,055 A | 12/1988 | Stuermer | |
| 4,930,615 A * | 6/1990 | Nash | 198/411 |
| 4,947,624 A | 8/1990 | Cones, Sr. et al. | |
| 5,101,716 A | 4/1992 | Cones, Sr. et al. | |
| 5,201,399 A * | 4/1993 | Dietrich | 198/409 |
| 5,473,862 A * | 12/1995 | Brizzi et al. | 53/447 |
| 5,485,772 A | 1/1996 | Bastasch et al. | |
| 5,540,943 A * | 7/1996 | Naramura | 426/274 |
| 5,546,848 A * | 8/1996 | Naramura | 99/326 |
| 5,551,550 A | 9/1996 | Marshall et al. | |
| 6,296,102 B1 | 10/2001 | Uchida et al. | |
| 6,935,484 B2 * | 8/2005 | Davis et al. | 198/416 |
| 2005/0034576 A1 | 2/2005 | Ray et al. | |

\* cited by examiner

PRODUCT DE-TOPPER

CROSS REFERENCE TO RELATED APPLICATIONS

This application claims priority to U.S. Provisional Patent Application Ser. No. 60/726,906 filed on Oct. 14, 2005.

TECHNICAL FIELD OF THE INVENTION

The present invention relates to equipment for assembling food products, and more specifically to an apparatus and method for separating or parting stacked food products.

BACKGROUND OF THE INVENTION

During the production and assembly of food products, various food components are processed and assembled along a conveying path into a final food product. For example, buns or biscuits may be sliced into at least upper and lower sections and then assembled with meat, cheese of other product slices or pieces between the upper and lower sections to make a sandwich.

To cut a bun or biscuit into the at least upper and lower sections, a whole bun or biscuit typically is conveyed along a conveying path (i.e. conveyor belt) and travels through and past a longitudinal band-saw located across the conveying path that longitudinally cuts the whole buns or biscuits into the at least two sections to define a separation line there-between.

After the bun or biscuit is cut into at least upper and lower sections by the band-saw blade, the respective sections are conveyed away from the blade in a "stacked" formation, i.e., the upper section lying directly on top of the lower section, with the separation line located there-between. However, during subsequent food assembly processes, it is advantageous that the upper section of the bun or biscuit be separated or "de-topped" from the lower section to allow the meat or cheese slices to be placed on the lower section during sandwich assembly processes.

Although "de-topper" mechanisms or assemblies are present in the art for parting stacked products such as bun or biscuit sections, numerous disadvantages are associated with these de-toppers. For example, some de-toppers present in the art utilize a conveyor mechanism to part or separate the stacked bun or biscuit sections. With such conveyor mechanisms, as the stacked upper and lower sections of the buns or biscuits are conveyed along a given pathway, the upper sections come into contact with a conveyor located generally transverse to the pathway of the stacked sections. The belt of the transverse conveyor is oriented about parallel to the sides of the upper bun or biscuit sections such that, when each upper section comes into contact with the moving belt, it is bumped transversely from each lower section, thus parting the sections at their separation line.

Transverses conveyors, however, have a conveyor belt and related components that are prone to contamination, thus requiring complex disassembly and cleaning procedures in compliance with government food production sanitary standards. Such complex disassembly and cleaning procedures of such transverse conveyors thus result in undesirable food production down-time and increased maintenance costs. Furthermore, the transverse conveyor is not readily adjustable in relation to the conveying path of the stacked bun or biscuit sections to allow for an adjustment of the angle of the transverse conveyor in relation to the conveying path.

Other de-topper mechanisms present in the art utilize a pivoted lever arm that pivots upwardly and downwardly in relation to the stacked bun or biscuit sections to drag the upper section of each bun or biscuit from the lower section. However, such pivoted lever arms suffer the disadvantage of placing each upper bun or biscuit section rearwardly of each lower section on a common conveying path, instead of placing the upper sections onto a conveying path separate from that of the lower sections.

Such a placement of each upper section rearwardly of each lower section on a common conveying path results in counter-productive confusion during any sandwich assembly process requiring that the top section of the bun or biscuit be replaced on top of the lower section and remaining sandwich components (i.e. on top of the bun or biscuit bottom section having meat, cheese or other products located thereon). The confusion results when assembly personnel have difficulty differentiating between the bun or biscuit upper and lower sections, due to their location on the common pathway, thus resulting in improperly-assembled sandwiches having the bottom section placed on top of the remaining sandwich components and/or the top section placed at the bottom of the sandwich.

Thus, what is needed is a product de-topper that is relatively simple in construction, thus avoiding complex disassembly and cleaning procedures that result in undesirable food production down-time and increased maintenance costs. Such a de-topper should be readily adjustable to facilitate an adjustment of the transverse angle at which the upper sections of the products are separated from the lower sections. The de-topper should also place the upper sections of the products onto a conveying path separate from that of the lower sections to facilitate the ready re-assembly of the sections without confusion. The present invention satisfies the foregoing needs.

SUMMARY OF THE INVENTION

The present invention relates to equipment for assembling food products, and more specifically to an apparatus and method for separating or parting stacked food products during a food production process. The invention, a de-topper, facilitates the desired parting or separation of stacked products along a separation line defining an elevation. For ease of description, the example of sliced, stacked biscuit food products will be used in describing the de-topper, but it is understood that any possible stackable food or non-food product can also be parted or separated by the de-topper as well.

Thus, using biscuits as an example, the de-topper is used as part of a food production line that assembles breakfast sandwiches from individual sandwich components comprising sliced biscuits or other breads, meats, cheeses, cooked egg patties and/or other products. A loading area precedes the de-topper for loading whole biscuits or other bread products onto at least one primary conveying path. The whole biscuits are thereafter conveyed to a slicer, preferably comprising a moving band-saw blade oriented transverse to the primary conveying path, that slices the biscuits longitudinally to create a stacked product having at least stacked upper and lower biscuit sections defining the separation line.

The stacked products are then conveyed along the at least one primary conveying path towards the de-topper, which parts or separates the stacked products along the separation line, and places the upper sections onto at least one secondary conveying path. The lower and upper sections are thereafter conveyed on the respective primary and secondary conveying paths away from the de-topper and towards an assembly area. Within the assembly area, the remaining components of the sandwich (i.e. meats, cheeses and/or egg patties) are stacked onto the lower biscuit sections, with the upper biscuit sections thereafter being removed from the at least one secondary conveying path and placed on top of the stacked sandwich components and associated lower sections to create assembled sandwich products. The assembled sandwich products are thereafter preferably conveyed on the at least one primary conveying path from the assembly area to a packaging area, where the assembled sandwich products are wrapped and/or boxed in desired packaging materials.

In parting stacked products along a separation line defining an elevation, the de-topper comprises a longitudinal arm defining leading and trailing ends, upper and lower portions, and opposite contact surfaces. The leading end of the arm defines a vertical pivot while the lower portion of the arm is located at an elevation at least equal to that of the separation line of the stacked products. The lower portion may thus define an elevation equal to or greater than (i.e., equal to or above) that of the separation line.

The at least one primary or inner conveying path is proximal to at least the leading end of the longitudinal arm. At least one inner barrier is located along the primary conveying path that defines the at least one secondary or outer conveying path. The at least one barrier further defines an upper portion located at an elevation less than equal to (i.e., below) that of the separation line of the products. A drive is operably connected to the longitudinal arm for reciprocating at least the trailing end of the arm about the pivot. Because the upper portion of the at least one inner barrier is located at an elevation less than equal to that of the separation line of the products while the lower portion of the arm is located at an elevation equal to or greater than that of the separation line, it thus follows that the upper portion of the at least one inner barrier is located at an elevation below that of the lower portion of the arm.

The longitudinal arm, preferably supported by a bracket, is positioned longitudinally along the at least one primary conveying path from the leading end defining the pivot. In the preferred embodiment of the invention, the arm is removably connected to the pivot to allow for both an ease of cleaning and an interchangeability of various arms of differing lengths. The pivot is rotatably connected to the bracket via an engagement of the pin with a pin opening defined in the bracket, with the bracket preferably located transverse to and above the at least one conveying path.

The drive, also preferably supported by the bracket, is operably connected to the longitudinal arm for reciprocating at least the trailing end of the arm about the pivot and in a sweeping motion across the at least one primary conveying path. In sweeping at least the trailing end of the arm across the at least one conveying path, it is thus understood that other sections of the arm, located inwardly of the trailing end and towards the arm's pivoted leading end, may be swept across the at least one primary path as well. A sweeping of an inwardly located arm section across the at least one conveying path thus results in at least the arm's trailing end sweeping across and beyond the conveying path (i.e., over the at least one inner barrier).

In one embodiment of the invention, the drive comprises a crank driven by a motor. The crank drives at least the trailing end of the longitudinal arm in a reciprocating, sweeping motion across the at least one primary conveying path. The crank, a simple kinematic mechanism well known in the art, converts the rotational energy of the motor into reciprocating, translational energy for driving the longitudinal arm in the sweeping motion. The crank thus preferably comprises a wheel of predetermined diameter, attached to a rotating output shaft of the motor, and having a link that connects the rotating wheel to the longitudinal arm. In another embodiment, the drive comprises a linear actuator that induces a translational motion to drive at least the trailing end of the arm in a reciprocating, sweeping motion across the at least one primary conveying path. The actuator preferably comprises a pneumatic cylinder which drives a rod connected to the arm. A repeated actuation and de-actuation of the actuator will thus cause the rod to drive the arm in a reciprocating motion.

In the preferred embodiment, the at least one primary conveying path comprises two primary conveying paths in parallel relation with one another leading towards and past the longitudinal arm, with the pivot of the longitudinal arm centrally located between the two paths. Thus, with the pivot of the longitudinal arm centrally located between the two primary conveying paths, at least the trailing end of the longitudinal arm, located along the conveying paths and "downpath" from the pivot, will sweep back and forth across the two paths when driven by the drive. The at least one inner barrier is located along the primary conveying path and defines the at least one secondary or outer conveying path, with each secondary conveying path located respectively outwardly of each primary conveying path. In the preferred embodiment, the at least one inner barrier comprises two inner barriers to define two secondary or outer conveying paths in parallel relation with and located respectively outwardly of the two primary conveying paths.

The location of the inner barriers along the primary paths to define the secondary paths also defines the width of the primary paths. The placement of the inner barriers thus establishes a predetermined width of the primary paths such that each path preferably accommodates the width of one biscuit thereon, with the paths accommodating a plurality of biscuits preferably in "single-file" formation. To define the widths of the secondary paths, at least one outer barrier can be located there-along to preferably accommodate the width of a single biscuit as well. The at least one outer barrier prevents the upper section of the biscuit deposited on the at least one secondary path from moving further transversely from and off of the path.

The longitudinal arm is driven by the drive to sweep at least the arm's trailing end back and forth across the two primary conveying paths. For at least upper and lower sections of a stacked product having a separation line defining a given elevation, the lower portion of the longitudinal arm is located at an elevation at least equal to (i.e. equal to or greater than) that of the separation line while the upper portion of the at least one barrier is located at an elevation less than equal to that of the separation line. Thus, when stacked products (i.e. stacks of biscuit sections) are located on one or more of the primary conveying paths having at least the trailing end of the longitudinal arm sweeping back and forth across the paths, the respective opposite contact surfaces of the arm contact each upper section of the respective biscuits (i.e. the section located above the separation line) to sweep it transversely from the biscuit's lower section and over the barrier's upper portion, thus depositing the biscuit's upper section onto the secondary conveying path. The at least one barrier, having an upper portion located at an elevation below or less than that of the separation line, prevents the biscuit's lower section from being transversely swept and deposited onto the secondary path along with the deposited upper section.

In contacting the upper section of the biscuit to sweep it transversely from the at least one primary path and onto the at least one secondary path, a preferred sweep angle of the arm is determined for each of the primary conveying paths to prevent any damage to or breakage of the biscuit upper section located thereon. Because the preferred sweep angle defines the degree at which at least the trailing end of the longitudinal arm sweeps across a given primary conveying path, too great of a sweep angle will cause the arm to impact a given upper section, possibly damaging or breaking it, while too little of an angle will result in an inadequate transverse displacement of the upper section in relation to the conveying paths. The sweep angle of the arm is thus preferably adjustable.

When adjusting the preferred sweep angle of the arm across the at least one primary conveying path, it may be necessary to change the length of the longitudinal arm to accommodate the width of the primary conveying path. Thus, in one embodiment, the arm is removable from the pivot to allow for the interchangeability of arms of different length. In another embodiment, the arm has an adjustable length to accommodate for changes in the arm's preferred sweep angle and/or changes in the width of the primary conveying path.

In use, the stacked products having upper and lower sections are conveyed on at least one primary conveying path towards the longitudinal arm. The longitudinal arm is reciprocated in a sweeping motion by a drive to contact the upper sections of the stacked products and place the upper sections onto at least one secondary conveying path. The lower and upper sections are then conveyed on the respective primary and secondary conveying paths away from the longitudinal arm.

DESCRIPTION OF THE PREFERRED EMBODIMENTS

Figure 1:
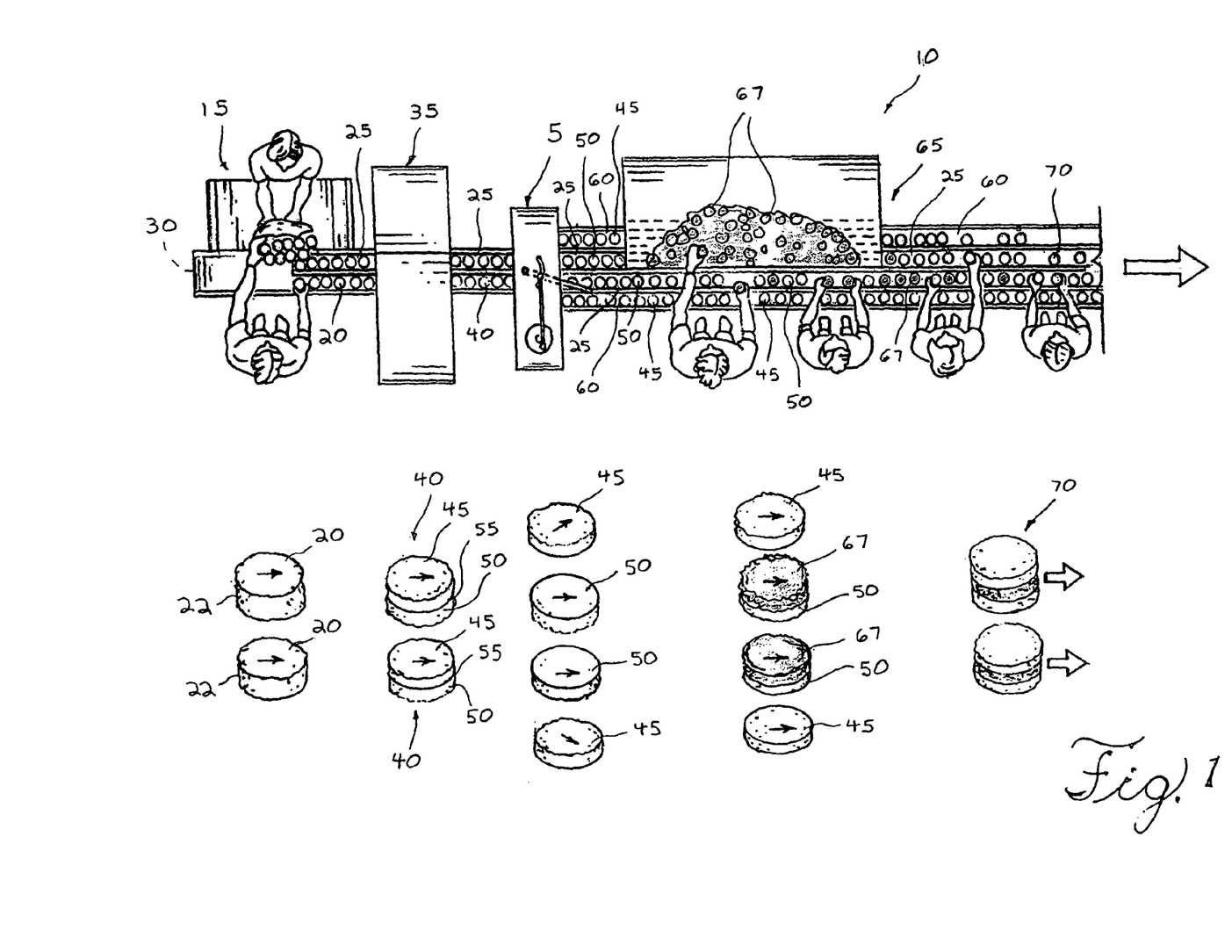
FIG. 1 is a plan view of the de-topper as part of a food production line, also including a perspective view of the food product after each step of the production process.

The present invention relates to equipment for assembling food products, and more specifically to an apparatus and method for separating or parting stacked food products during a food production process. The invention, a de-topper, facilitates the desired parting or separation of stacked products along a separation line defining an elevation. For ease of description, the example of sliced, stacked biscuit food products will be used in describing the de-topper, but it is understood that any possible stackable food or non-food product can also be parted or separated by the de-topper as well. FIG. 1 illustrates a plan view of one embodiment of the de-topper 5 as part of a food product production line 10, along with a perspective view of the biscuit food product after each step of the production process. As illustrated in FIG. 1, the line preferably assembles breakfast sandwiches from individual sandwich components comprising sliced biscuits or other breads, meats, cheeses, cooked egg patties and/or other products. Although FIG. 1 illustrates the de-topper 5 used at part of a breakfast sandwich production line, it is understood that the de-topper may be used in other food product production lines and non-food product production lines as well.

As illustrated therein, preceding the de-topper 5 is a loading area 15 for loading whole biscuits 20 or other bread products onto at least one primary conveying path 25, preferably supported by a frame 30. The whole biscuits 20, defining a peripheral outer surface 22, are thereafter conveyed to the slicer 35, which preferably comprises a moving band-saw blade oriented transverse to the primary conveying path 25. The slicer 35 thus slices the biscuits longitudinally to create a stacked product 40 having at least stacked upper and lower biscuit sections 45 and 50 defining the separation line 55.

The stacked products 40 are then conveyed along the at least one primary conveying path 25 towards the de-topper 5, which parts or separates the stacked products along the separation line 55 and places the upper sections 45 onto at least one secondary conveying path 60, also preferably supported by the frame 30. The lower and upper sections 50 and 45 are thereafter conveyed on the respective primary and secondary conveying paths 25 and 60 away from the de-topper 5 and towards the assembly area 65.

Within the assembly area 65, the remaining components of the sandwich (i.e. meats, cheeses and/or egg patties 67) are stacked onto the lower biscuit sections 50, with the upper biscuit sections 45 thereafter being removed from the at least one secondary conveying path 60 and placed on top of the stacked sandwich components and associated lower sections 50 to create assembled sandwich products 70. The assembled sandwich products 70 are thereafter preferably conveyed on the at least one primary conveying path 25 from the assembly area 65 to a packaging area (not shown), where the assembled sandwich products are wrapped and/or boxed in desired packaging materials.

Figure 2:
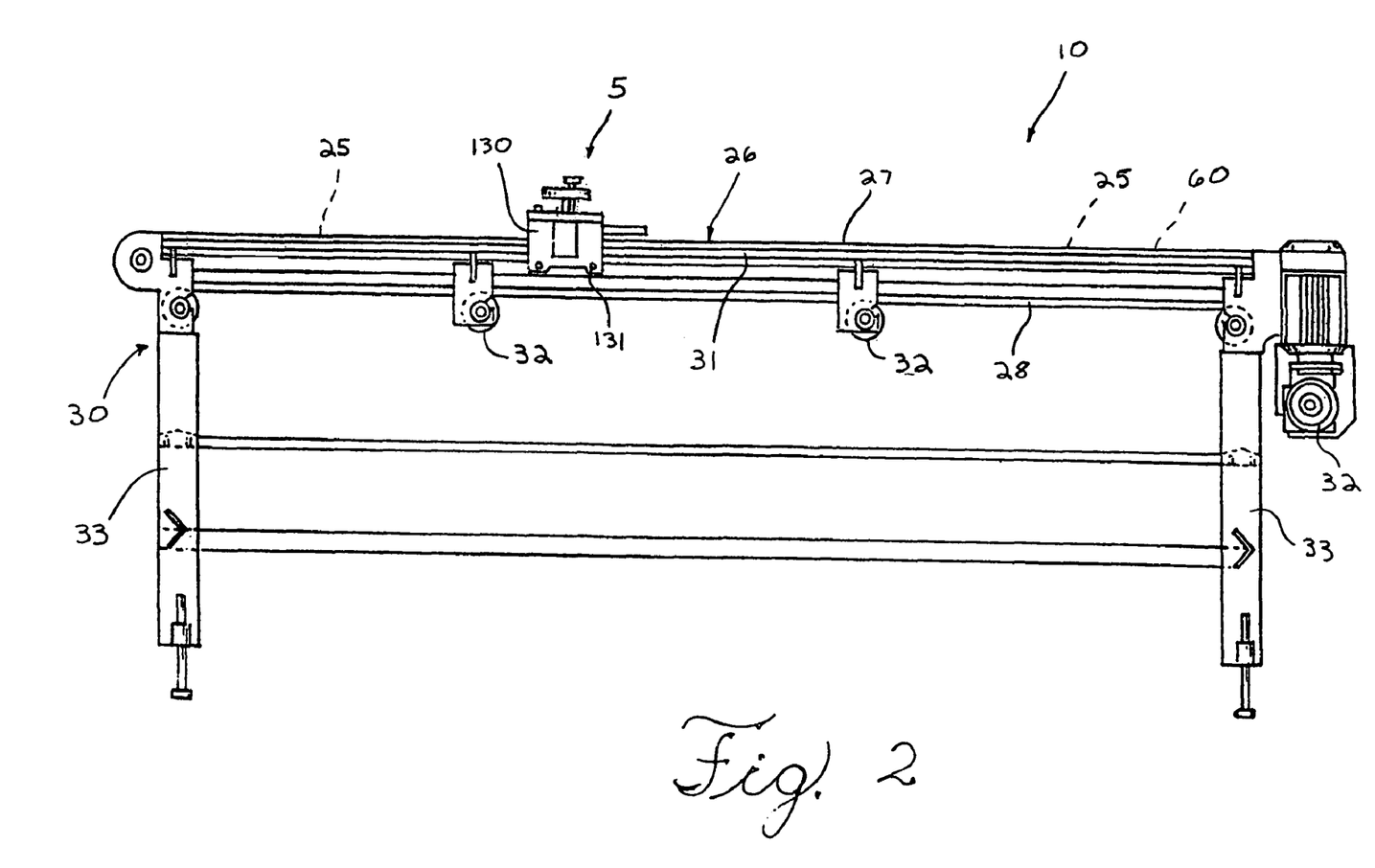
FIG. 2 illustrates a side view of the de-topper and production line of FIG. 1 with the loading area, slicer, and assembly area removed for clarity.

FIG. 2 illustrates a side view of the de-topper 5 and production line 10 of FIG. 1 with the loading area 15, slicer 35, and assembly area 65 removed for clarity. As illustrated therein, the at least one primary and secondary conveying paths 25 and 60 preferably comprise one or more endless belts 26 supported by a conveyor bed 31 of the frame 30 and supported and/or driven by one or more rollers 32, as common in the art. The frame 30 typically comprises the conveyor bed 31 supported by a plurality of legs 33, with the one or more rollers 32 preferably supported by the frame. The one or more endless belts of the conveying paths define both an upper portion (conveying run) 27 and lower portion (return run) 28, with the upper portion supported by the conveyor bed 31 and, in turn, supporting the conveyed food products. Although each primary and secondary conveying path may comprise a single belt 26, it is understood that a single belt may be utilized for more that one path, with the multiple paths for a single belt defined by barriers, to be described further.

Figure 3:
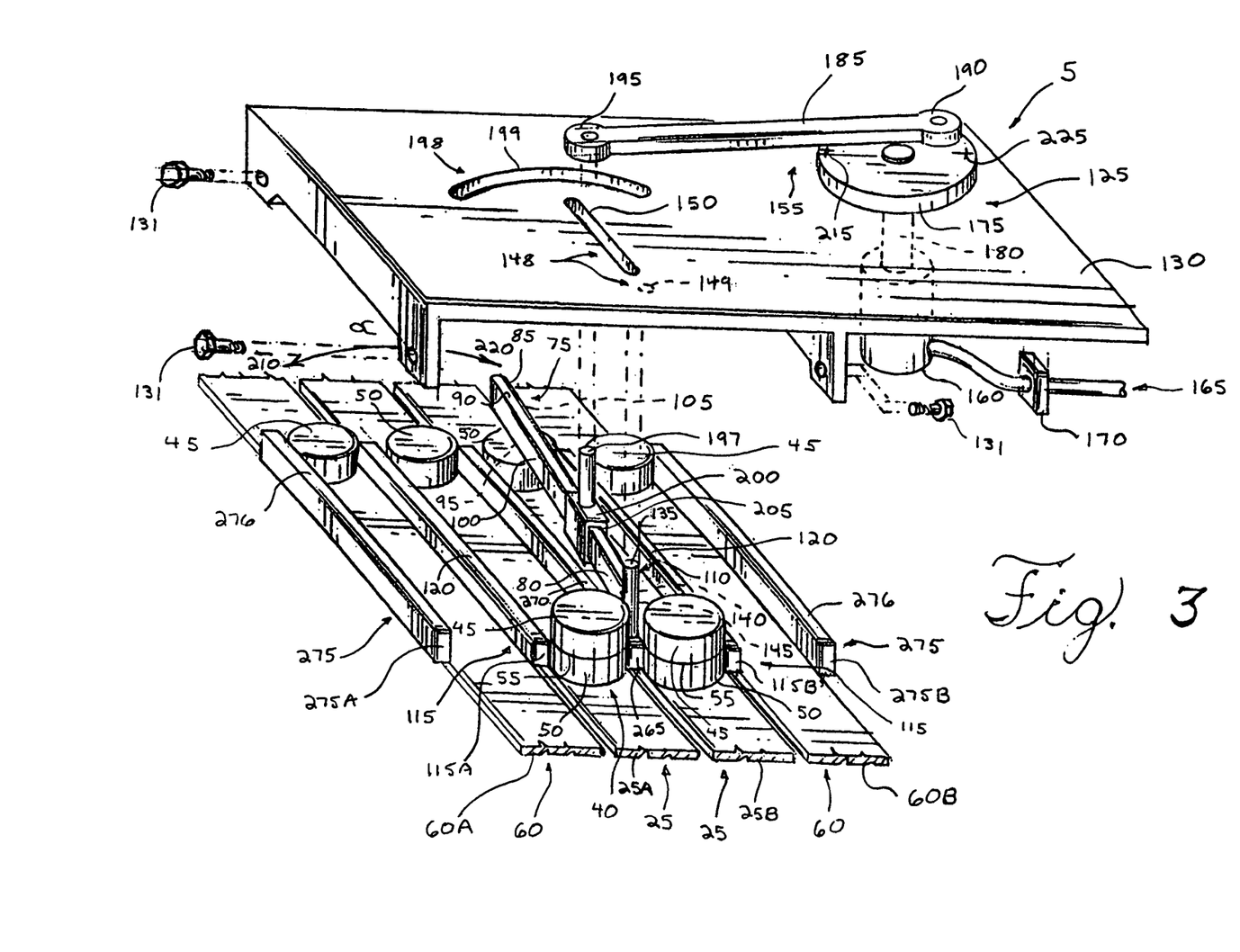
FIG. 3 is a detailed perspective view of one embodiment of the de-topper of FIG. 1.

FIG. 3 shows a more detailed view of the basic components of one embodiment of the de-topper 5 illustrated in FIG. 1. In parting stacked products 40 along a separation line 55 defining an elevation, the de-topper 5 comprises a longitudinal arm 75 defining leading and trailing ends 80 and 85, upper and lower portions 90 and 95, and opposite contact surfaces 100 and 105. The leading end 80 of the arm 75 defines a vertical pivot 110 while the lower portion 95 of the arm is located at an elevation at least equal to that of the separation line 55 of the stacked products 40. The lower portion 95 may thus define an elevation equal to or greater than (i.e., equal to or above) that of the separation line 55.

The at least one primary or inner conveying path 25 is proximal to at least the leading end 80 of the longitudinal arm 75. At least one inner barrier 115 is located along the primary conveying path 25 that defines the at least one secondary or outer conveying path 60. The at least one barrier 115 further defines an upper portion 120 located at an elevation less than equal to (i.e., below) that of the separation line 55 of the products 40. A drive 125 is operably connected to the longitudinal arm 75 for reciprocating at least the trailing end 85 of the arm about the pivot 110. Because the upper portion 120 of the at least one inner barrier 115 is located at an elevation less than equal to that of the separation line 55 of the products while the lower portion 95 of the arm 75 is located at an elevation equal to or greater than that of the separation line, it thus follows that the upper portion of the at least one inner barrier is located at an elevation below that of the lower portion of the arm.

The longitudinal arm 75 preferably comprises an elongated strip of rigid plastic material approved by the USDA and FDA for food grade service. A preferred material may thus comprise ultra-high molecular weight (UHMW) polyethylene. While plastic is the preferred material of choice, it is understood that other materials may be utilized as well, to include stainless steel, aluminum, various alloys, and/or composite materials. Furthermore, although FIG. 3 illustrates the arm lower portion 95 and barrier upper portion 120 as having flat cross sections, it is understood that the respective portions can define any cross section, to include a curve, syncline or any other shape as well.

The longitudinal arm 75, preferably supported by a bracket 130, is positioned longitudinally along the at least one primary conveying path 25 from the leading end 80 defining the pivot 110. The pivot 110 preferably comprises a vertical pin 135 attached to the arm's leading end 80. The attachment of the pin 135 to the arm 75 preferably comprises a welding or bonding of the pin to the arm. However, it is understood that other means may be utilized to connect the components together, to include a threaded or bolted connection of the pin 135 to the arm 75 to define the pivot 110.

In the preferred embodiment of the invention showed in FIG. 3, the arm 75 is removably connected to the pivot 110 to allow for both an ease of cleaning and an interchangeability of various arms of differing lengths, to be discussed further. To facilitate the removable connection of the arm 75 to the pivot 110, the pivot comprises a longitudinal sleeve 140 connected to the pin 135 (more clearly illustrated in FIG. 7A), with the sleeve defining an opening 145 adapted to receive the leading end 80 of the arm therein. The pin 135 and sleeve 140 are preferably comprised of corrosion resistant materials, such as stainless steel, aluminum, or other alloys, with the connection of the pin to the sleeve preferably comprising a welded or bonded connection. However, it is understood that other means may be utilized to connect the components together, to include a threaded or bolted connection of the pin 135 to the sleeve 140 to define the pivot 110. The leading end 80 of the arm 75 is removably secured within the sleeve 140 via resistance fit, or via pin, set screw or other similar means.

The vertical pin 135 of the pivot 110 is rotatably connected to the bracket 130 via an engagement of the pin with a pin opening 148 defined in the bracket. In one embodiment, the opening 148 may define a bore 149 (shown in phantom on bracket 130 in FIG. 3) adapted for a rotatable engagement with the pin 135. In the preferred embodiment, however, the opening 148 defines a longitudinal slot 150 to facilitate an adjustable connection of the pin 135 to the bracket 130. The slot 150 allows for a translational adjustment of the arm 75 in relation to the bracket 130 by allowing a rotational connection of the pin 135 to the bracket anywhere along the slot. A common coupling or similar fastening device (not shown) is preferably used to secure the rotating pin 135 to the bracket 130 within the slot 150 to prevent the pin from translating longitudinally within the slot from the desired secured location therein.

The bracket 130, preferably located transverse to and above the at least one conveying path 25, is preferably removably connected to the frame 30 supporting the path by bolts or other common fasteners 131 (see also FIG. 2). The bracket 130 has a rigidity to support at least the longitudinal arm 75 and is preferably comprised of stainless steel, due to its inherent resistance to corrosion resulting from the presence of moisture and cleaning agents. However, while stainless steel is the preferred material of choice, it is understood that other corrosion-resistant materials may be utilized as well, to include aluminum, various alloys, or composite materials.

The reciprocating drive 125, also preferably supported by the bracket 130, is operably connected to the longitudinal arm 75 for reciprocating at least the trailing end 85 of the arm about the pivot 110 and in a sweeping motion across the at least one primary conveying path 25. In sweeping at least the trailing end 85 of the arm 75 across the at least one conveying path, it is thus understood that other sections of the arm, located inwardly of the trailing end and towards the arm's pivoted leading end 80, may be swept across the at least one primary path as well. A sweeping of an inwardly located arm section across the at least one conveying path thus results in at least the arm's trailing end 85 sweeping across and beyond the conveying path (i.e., over the at least one inner barrier 115).

In one embodiment of the invention, the drive 125 comprises a crank 155 driven by a motor 160. In the embodiment illustrated within FIG. 3, the motor 160 comprises a pneumatic motor driven by an air supply 165. A regulator or valve 170 is preferably utilized to regulate the flow of air to the pneumatic motor to control the motor's rotational speed. While a pneumatic motor and air regulator 170 are utilized in the preferred embodiment of the invention, it is understood that an electric motor or stepper motor with motor control, or hydraulic motor with regulator, may be utilized as well.

The crank 155 drives at least the trailing end 85 of the longitudinal arm 75 in a reciprocating, sweeping motion across the at least one primary conveying path 25. The crank 155, a simple kinematic mechanism well known in the art, converts the rotational energy of the motor 160 into reciprocating, translational energy for driving the longitudinal arm 75 in the sweeping motion. The crank 155 thus preferably comprises a wheel 175 of predetermined diameter, attached to a rotating output shaft 180 of the motor, and having a link 185 that connects the rotating wheel to the longitudinal arm 75.

A driving end 190 of the link 185 is rotatably connected preferably proximal to an outer periphery of the wheel 175 while a driven end 195 of the link is rotatably connected to the longitudinal arm 75. In the preferred embodiment of the invention, an arbor 197 projects upwardly from the longitudinal arm 75 and through an arbor opening 198 defined in the bracket for rotatable connection with the link's driven end 195. Although the arbor opening 198 may define any shape (i.e. circle, rectangle, square, etc) that allows for a movement of the arbor 197 therein in relation to the sweeping motion of the arm, the opening preferably comprises arcuate slot 199. The attachment of the arbor 197 to the arm 75 preferably comprises a welding or bonding of the arbor to the arm. However, it is understood that other means may be utilized to connect the components together, to include a threaded or bolted connection of the arbor 197 to the arm 75 as well.

In the embodiment illustrated in FIG. 3, the location of the arbor 197 in relation to the arm 75 is preferably adjustable such that the driven end 195 of the link 185 can be connected anywhere along the arm's length. To facilitate the adjustable connection of the link's driven end 195 to the arm 75, the arbor 197 is connected to a collar 200 defining a through opening 205 adapted to accept an insertion of the arm therethough. The arm 75 is removably secured within the collar 200 via resistance fit, or via pin, set screw or other similar means.

The wheel 175 of the drive 125 is preferably located laterally or to the side of the longitudinal arm 75 such that one half of a complete revolution of the wheel defines a total angle of sweep a of the arm. For example, as illustrated in FIG. 3, the wheel 175 is located to the right of the longitudinal arm 75 such that a left-most limit 210 of the arm's sweep will be defined by a left-dead-center position 215 of the of the wheel while a right-most limit 220 of the arm's sweep will be defined by a right-dead-center position 225 position of the wheel. While FIG. 3 illustrates the drive 125 as located to the right of the longitudinal arm 75, it is understood that the drive can be located to the left of the arm as well, with the left and right-most limits of the sweeping arm again corresponding respectively with the left and right-dead-center positions of the wheel.

Figure 4:
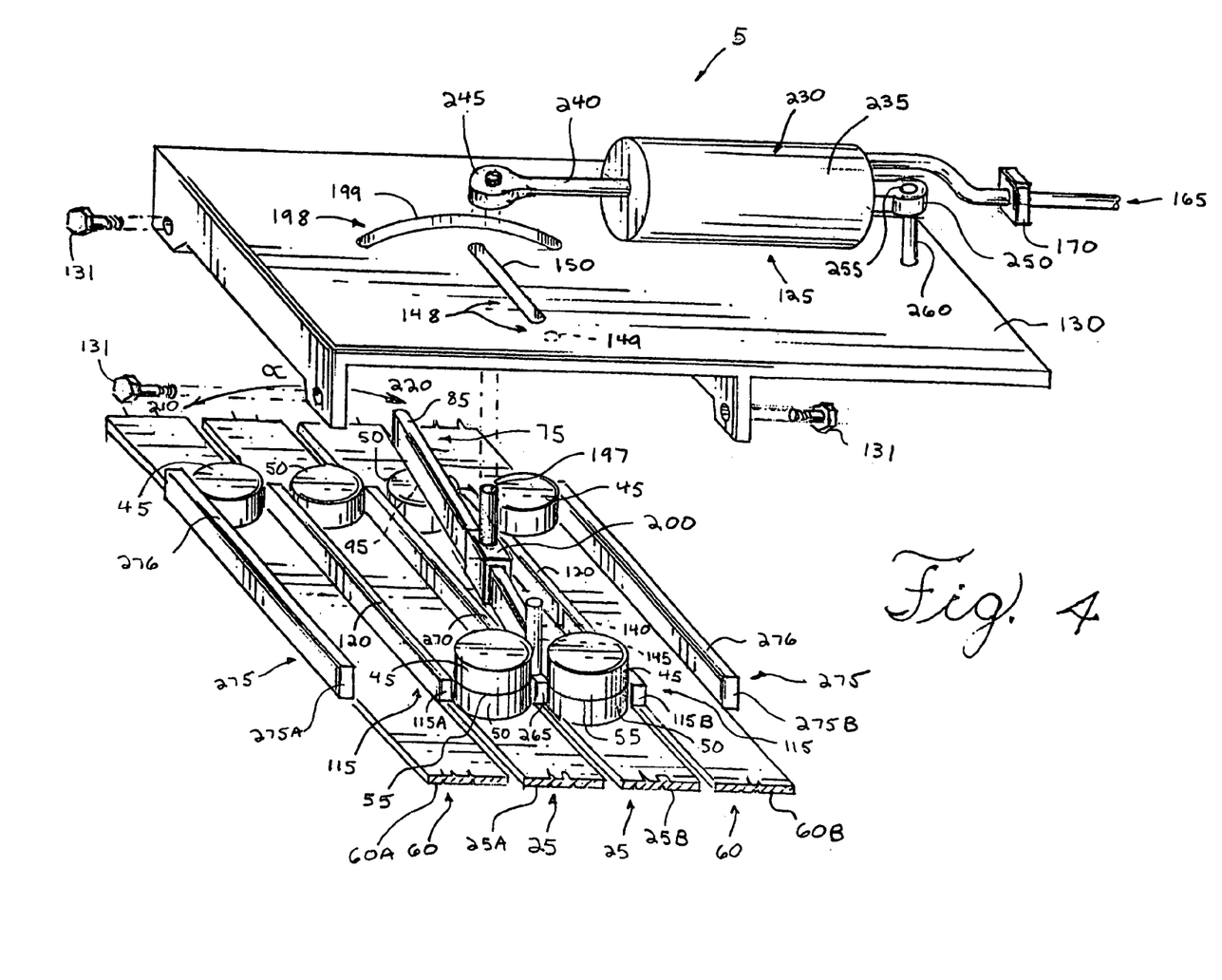
FIG. 4 is a detailed perspective view of an alternate embodiment of the de-topper of FIG. 1.

In another embodiment of the de-topper 5 illustrated in FIG. 4, the drive 125 comprises a linear actuator 230. The actuator 230 induces a translational motion to drive at least the trailing end 85 of the arm 75 in a reciprocating, sweeping motion across the at least one primary conveying path 25. The actuator 230 preferably comprises a pneumatic cylinder 235, again driven by an air supply 165, which drives a rod 240 having a driven end 245 rotatably connected to the arbor 197 of the arm 75. The regulator or valve 170 is again preferably utilized to regulate the flow of air to the cylinder 235 to control the actuator's movements. While a pneumatic cylinder 235 and air regulator 170 are utilized in the embodiment illustrated within FIG. 4, it is understood that electric or hydraulic actuators with respective controls and regulators may be utilized as well.

Again, the arbor 197 may be attached to the arm via welding, bonding, screws, bolts or other means. However, the location of the arbor 197 in relation to the arm 75 is preferably adjustable via the collar 200 such that the actuator rod's end 245 can be connected anywhere along the arm's length. Similar to the crank, the actuator 230 is preferably located laterally or to the side of the longitudinal arm 75 such that a complete stroke of the rod 240 defines the total angle of sweep a of the arm. When the actuator 230 is actuated, the rod 240 is driven outwardly from the cylinder 235 to drive the rod's driven end 245 in a translational motion to define the arm's left-most limit 210. A de-actuation of the actuator 230 will thus cause the rod 240 to retract into the cylinder 235, thus retrieving the driven end 245 of the rod in a translational motion to define the arm's right-most limit 220. A repeated actuation and de-actuation of the actuator 230 will thus cause the rod 240 to drive the arm 75 in a reciprocating motion.

Because the movement of the arm 75 and arbor 197 define a sweeping motion, the actuator 230 is preferably rotatably mounted at an end 250 thereof to the bracket 130 such that the actuator can pivot slightly as the arbor and driven end of the actuator traverse the arcuate slot 199 defined in the bracket. In the preferred embodiment, the cylinder 235 defines a bore 255 at its end 250 for mating engagement with an upwardly directed boss 260 defined on the bracket 130. The engagement of the bore 255 defined in the cylinder end 255 with the boss 260 defined on the bracket 130 defines the rotatable connection of the actuator to the bracket. Although the rotatable connection between the actuator 230 and the bracket 130 is defined by the engagement of the actuator's bore 255 with the boss 260, it is understood that their rotatable engagement may be facilitated by various other means, to include bolts, hinges and other similar means capable of facilitating the rotatable relationship.

As illustrated in FIGS. 3 and 4, in the preferred embodiment, the at least one primary conveying path 25 comprises two primary conveying paths 25A and 25B in parallel relation with one another leading towards and past the longitudinal arm, with the pivot 110 of the longitudinal arm centrally located between the two paths. Thus, with the pivot 110 of the longitudinal arm 75 centrally located between the two primary conveying paths 25A and 25B, at least the trailing end 85 of the longitudinal arm, located along the conveying paths and "down-path" from the pivot, will sweep back and forth across the two paths when driven by the drive 125. While two primary conveying paths 25A and 25B of the at least one path 25 are shown for the sake of example, it is understood that fewer or additional primary conveying paths can be utilized as well, with any additional primary paths lying about the pivot 110 and in parallel relation with and outwardly of the two primary paths illustrated, and having an additional corresponding secondary path outwardly located there-along.

In addition to having a pivot 110 of the longitudinal arm 75 centrally located between the two primary conveying paths 25A and 25B, a central divider 265 is also preferably located between the two paths, with the divider defining an upper portion 270 located at an elevation below that of the lower portion 95 of the arm 75. Because the central divider 265 is located between the two primary conveying paths 25A and 25B along with the pivot 110 of the longitudinal arm 75, the upper portion 270 of the central divider is located at an elevation below that of the lower portion 95 of the arm to ensure that no interfering contact between the divider and arm occur as the arm sweeps back and forth across the primary paths. If the arm utilizes a pivot pin 135 connected to the sleeve 140 and/or the arbor 197 connected to the collar 200, it is noted that an adequate distance exists between the arm's lower portion 95 and the central divider's upper portion 270 to ensure that no interfering contact occur between upper portion of the central divider and the sleeve and/or collar of the arm. An adequate distance also exists between the arm's lower portion 95 and the at least one inner barrier's upper portion 120 to similarly ensure that that no interfering contact occur between upper portion of the at least one inner barrier and the collar of the arm, if utilized.

The at least one inner barrier 115 is located along the primary conveying path 25 and defines the at least one secondary or outer conveying path 60, with each secondary conveying path located outwardly of each primary conveying path. Again, the at least one inner barrier 115 defines an upper portion 120 located at an elevation less than equal to that of the separation line of the stacked products, thus also being located at an elevation less than or below that of the lower arm portion 95. As illustrated in FIGS. 3 and 4, in the preferred embodiment, the at least one inner barrier 115 comprises two inner barriers 115A and 115B to define two secondary or outer conveying paths 60A and 60B in parallel relation with and located respectively outwardly of the two primary conveying paths. While two inner barriers 115A and 115B of the at least one barrier 115 are illustrated for the sake of example defining two secondary conveying paths 60A and 60B of the at least one secondary conveying path 60, it is understood that fewer or additional inner barriers can be utilized as well to define fewer or additional secondary conveying paths, with any additional secondary paths lying in parallel relation with and outwardly of the two secondary paths illustrated and having corresponding primary paths respectively located there-between. The quantity of additional secondary paths should thus preferably correspond with the quantity of any additional primary paths.

The location of the inner barriers 115A and 115B along the primary paths 25A and 25B to define the secondary paths 60A and 60B also defines the width of the primary paths. The placement of the inner barriers 115A and 115B thus establishes a predetermined width of the primary paths 25A and 25B such that each path preferably accommodates the width of one biscuit thereon, with the paths accommodating a plurality of biscuits preferably in "single-file" formation. To define the widths of the secondary paths 60A and 60B, at least one outer barrier 275 (i.e. outer barriers 275A and 275B) can be located there-along to preferably accommodate the width of a single biscuit as well. The at least one outer barrier 275 defines an upper portion 276 located at an elevation that is less than, equal to, or greater than that of the separation line 55 to prevent the upper section 45 of the biscuit deposited on the at least one secondary path 60 from moving further transversely from and off of the path. It is understood that although the primary and secondary conveying paths 25 and 60 preferably accommodate a plurality of stacked or parted biscuit sections in single-file formation as illustrated in FIG. 1, FIGS. 3 and 4, as well as the remaining figures illustrating the operation of the de-topper on such biscuit sections, illustrate only selected stacked and parted biscuit sections for the sake of clarity.

Figure 5:
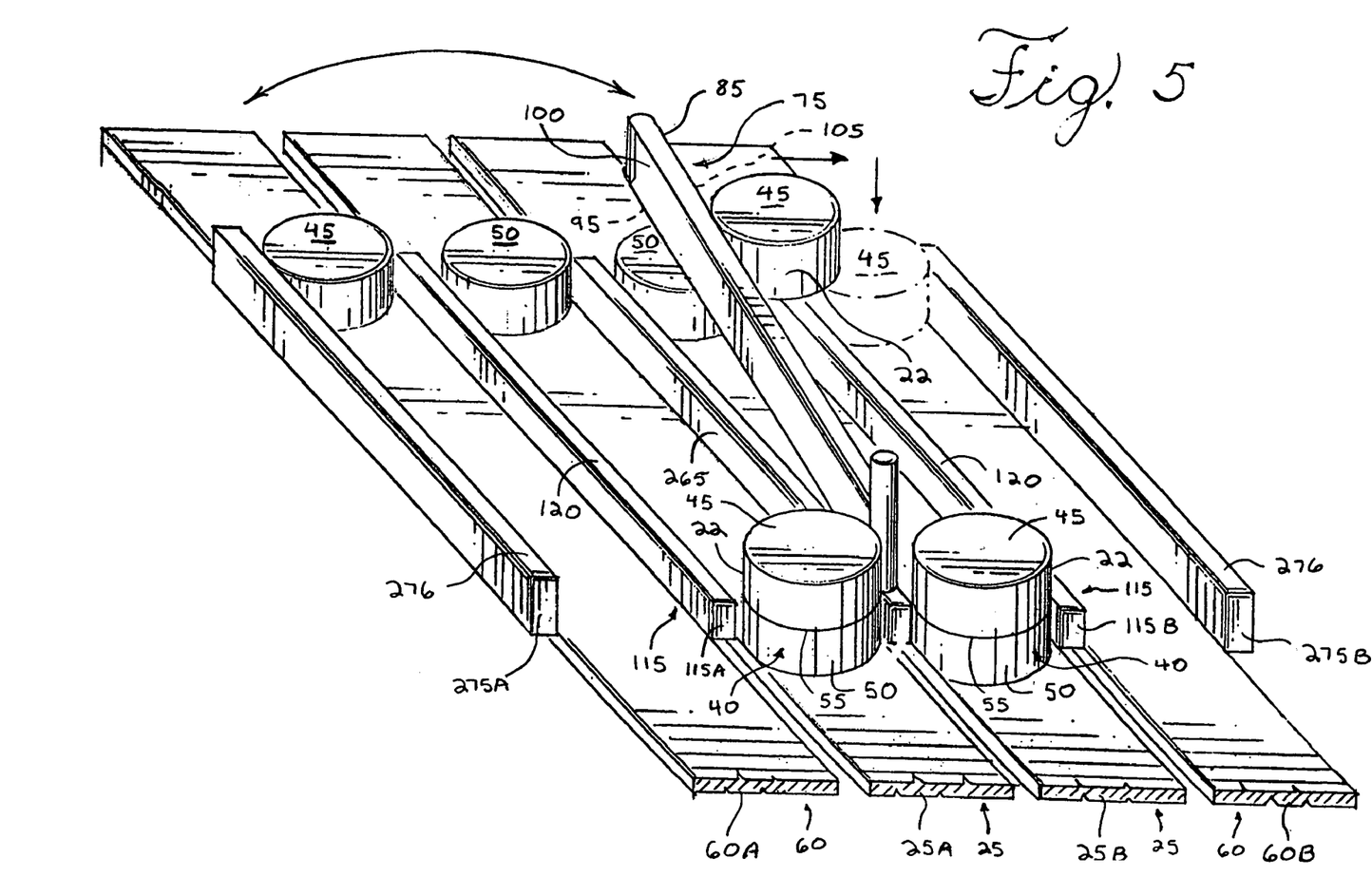
FIG. 5 is a perspective view of the de-topper components showing the relationship between the longitudinal arm, conveying paths, barriers and food products.

Referring to FIG. 5 for a more detailed discussion of the longitudinal arm in relation to the conveying paths and barriers, the longitudinal arm 75 (illustrated with the arbor 197 and collar 200 removed for clarity) is driven by the drive 125 to sweep at least the arm's trailing end 85 back and forth across the central divider 265 and the two primary conveying paths 25A and 25B. For at least upper and lower sections 45 and 50 of a stacked product 40 having a separation line 55 defining a given elevation, the lower portion 95 of the longitudinal arm 75 is located at an elevation at least equal to (i.e. equal to or greater than) that of the separation line while the upper portion 120 of the at least one barrier 115 is located at an elevation less than equal to that of the separation line. Thus, when stacked products 40 (i.e., stacks of biscuit sections) are located on one or more of the primary conveying paths 25A and 25B having at least the trailing end 85 of the longitudinal arm 75 sweeping back and forth across the paths, the respective opposite contact surfaces 100 and 105 of the arm contact the outer peripheral surface 22 of each upper section 45 of the respective biscuits (i.e. the section located above the separation line 55) to sweep the sections transversely from the respective primary conveying paths.

Because the lower portion 95 of the longitudinal arm 75 is located at an elevation at least equal to (i.e., equal to or above) that of the separation line 55 while the upper portion 120 of the at least one inner barrier 115 is located at an elevation below or less than that of the separation line, the contact surface 100 or 105 of the arm will contact the outer periphery 22 of the upper section 45 of the stacked product 40 to sweep it transversely from the lower section 50 and over the barrier's upper portion, thus depositing the upper section onto the secondary conveying path 60A or 60B. The at least one barrier 115, having an upper portion 120 located at an elevation below or less than that of the separation line 55, thus prevents the lower section 50 from being transversely swept and deposited onto the secondary path along with the deposited upper section 45.

Figure 6:
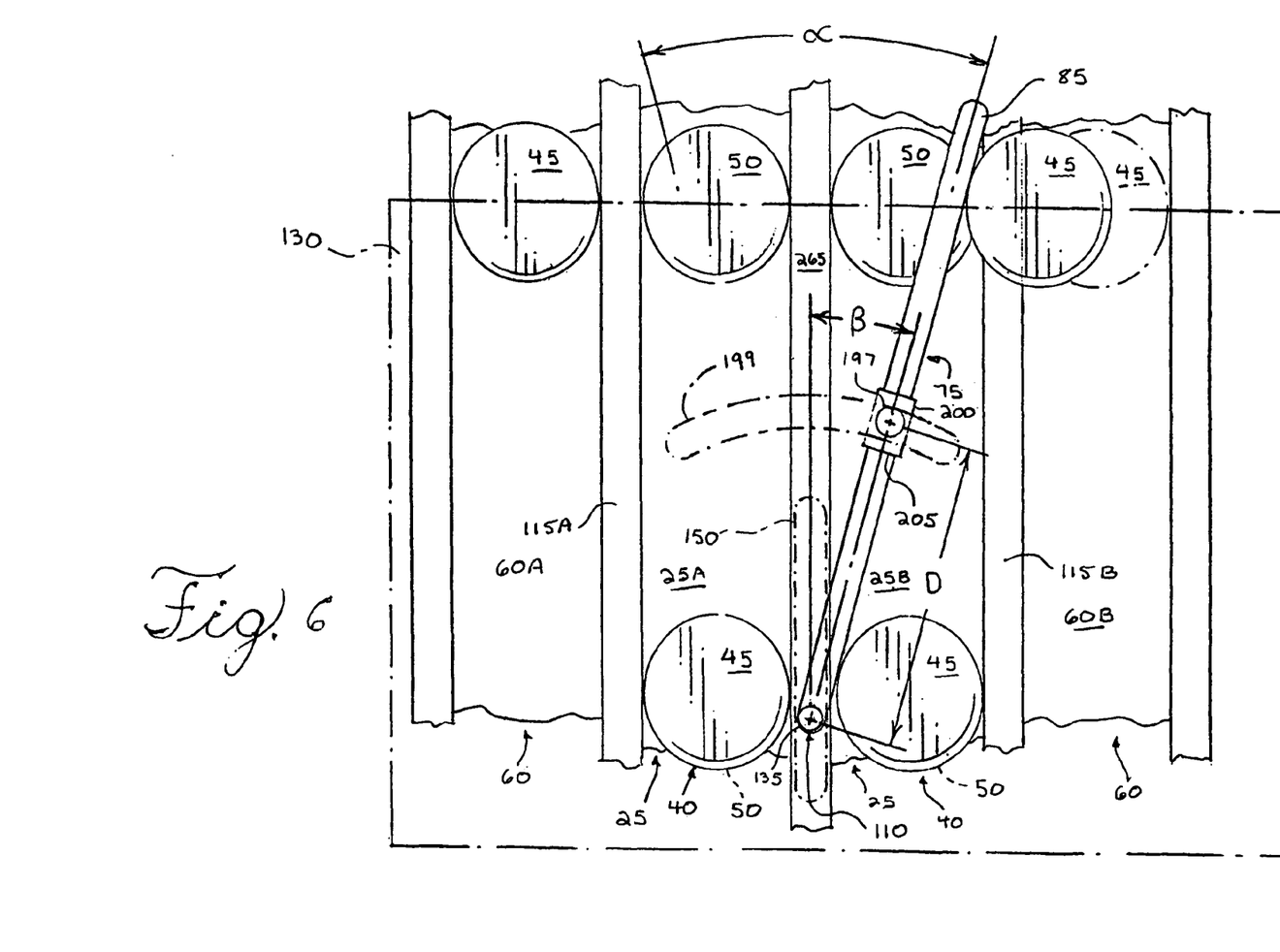
FIG. 6 is a plan view of the de-topper components showing the preferred angle of the longitudinal arm and the means for adjusting the angle.

FIG. 6 illustrates a plan view of the angle of the longitudinal arm 75 in relation to the at least one primary conveying path 25. In contacting the upper section 45 of the biscuit to sweep it transversely from the at least one primary path 25 and onto the at least one secondary path 60, a preferred sweep angle β of the arm 75 is determined for each of the primary conveying paths 25A and 25B to prevent any damage to or breakage of the biscuit upper section located thereon. Because the preferred sweep angle β defines the degree at which at least the trailing end 85 of the longitudinal arm 75 sweeps across a given primary conveying path, too great of a sweep angle will cause the arm to impact a given upper section 45, possibly damaging or breaking it, while too little of an angle will result in an inadequate transverse displacement of the upper section in relation to the conveying paths. Too great of an angle may also cause the arm 75 to sweep the biscuit upper section 45 in a rearward direction instead of a transverse direction, resulting in a jamming or disruption of the remaining biscuits located on the at least one primary path 25.

In determining the preferred sweep angle β for each of the primary conveying paths 25A and 25B, the central divider 265 serves as a reference point to bisect the total angle of sweep α such that the preferred sweep angle β will occur across each primary path located on opposite sides of the divider. Thus using a center of the divider 265 as a zero reference point, the preferred sweep angle β of the arm 75 across a conveying path is from about 5 degrees to about 90 degrees, optionally from about 10 degrees to about 45 degrees, and preferably from about 15 degrees to about 35 degrees from the divider. As illustrated in FIG. 6, because the preferred sweep angle β represents a bisection of the total sweep angle α across the primary conveying paths 25A and 25B, the above-recited angles represent displacement angles into each primary conveying path. It is understood, however, that the preferred sweep angle β may apply to only a single primary conveying path of the at least one primary conveying path 25 as well.

The adjustable connection of the driven link end 195 or rod end 245 to the arbor 197 of the longitudinal arm 75 via the collar 200, and of the pivot pin 135 to the bracket 130 (shown in phantom within FIG. 6) via the longitudinal slot 150, facilitates an adjustment of the preferred sweep angle β of the arm 75. The distance "D" along the longitudinal arm 75 between the link's or rod's driven end 195 or 245 (i.e. arbor 197) and the pivot 110 may be increased or decreased by adjusting the location of the pin 135 within the slot 150 and the arm 75 within the collar 200 to increase or decrease the angle accordingly. A shorter distance "D" along the arm between the pivot 110 and the link's or rod's driven end 195 or 245 will result in an increased preferred sweep angle β while a longer distance along the arm between the two points will result in a decreased sweep angle. The arcuate slot 199 has a predetermined size and dimension to accommodate any changes in the preferred sweep angle. Although FIG. 6 illustrates an adjustment of the preferred sweep angle β via an adjustment of the location of the collar 200 along the arm 75 and the pivot pin 135 within the longitudinal slot 150, it is understood that it may be possible to adjust the location of the connection of the driving end 190 of the link 185 to the wheel 175 of the crank 155, and/or the length of the link itself, to vary the angle of sweep of the arm. It is further understood that it may be possible to vary the length of the stroke of the linear actuator 230 to vary the angle of sweep of the arm as well.

Figures 7A, 7B:
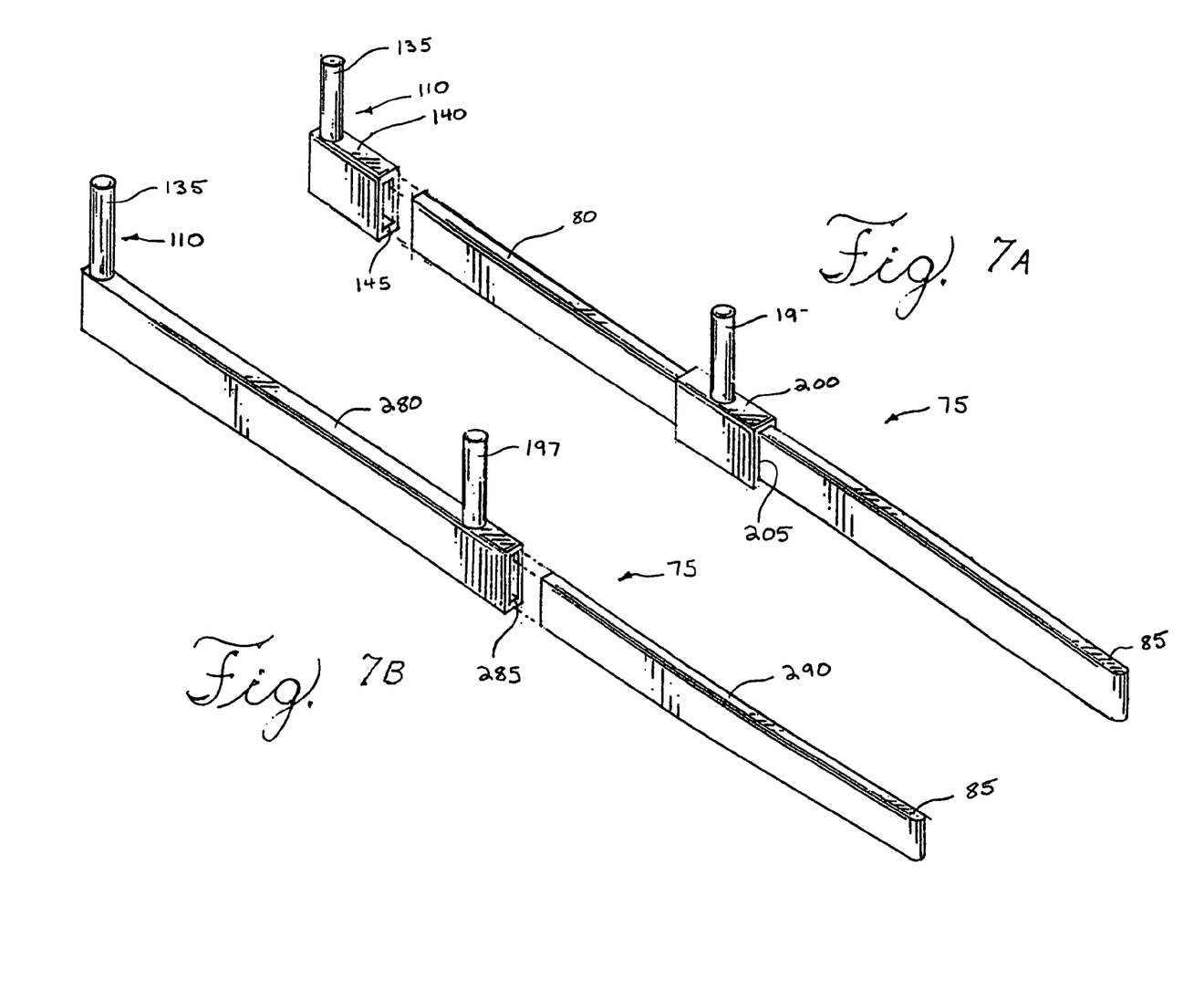
FIG. 7A is a perspective view of one embodiment of the longitudinal arm adapted for interchangeability.
FIG. 7B is a perspective view of another embodiment of the longitudinal arm adapted to have an adjustable length.

In adjusting the preferred sweep angle β across the at least one primary conveying path, it may be necessary to change the length of the longitudinal arm 75 to accommodate the width of the primary conveying path. For example, if the preferred sweep angle β is decreased across the conveying path, it may be necessary to use a longer longitudinal arm 75 to ensure that at least the trailing end 85 of the arm sweeps the entire width of each primary conveying path. As illustrated in FIG. 7A, the arm can thus be exchanged by removing the leading end 80 of the arm from the opening 145 of the sleeve 140 of the pivot 110 and sliding the arm out through the opening 205 of the collar 200 of the driving end 195 of the link 185 or rod 240, thereafter replacing the arm with one having a longer length.

As illustrated in FIG. 7B, in another embodiment of the invention, the de-topper 5 can utilize a longitudinal arm 75 having an adjustable length to accommodate changes in the preferred sweep angle β and/or changes in the width of the primary conveying path. The arm may this comprise a hollow base 280 connected to the arbor 197 and defining a base opening 285 adapted to accept a sliding insertion of an elongated extension 290 therein. The sliding engagement between the base 280 and extension 290 is adjustable such that the extension defines the trailing end 85 of the arm 75 that is adjustable to shorten or lengthen the arm accordingly. Furthermore, the sliding engagement between the extension 290 and base 280 is adjustable via resistance fit, pin, set-screw or any similar means to adjustably secure the extension 90 within the base. While FIG. 7B illustrates the base 280 of the arm as attached to the pin 135 to define the pivot 110, the sleeve 140 of FIG. 7A may also be utilized to facilitate a removable connection between the base and the pivot. Similarly, while FIG. 7B illustrates the base 280 of the arm as attached to the arbor 197, the collar 200 of FIG. 7A may also be utilized to facilitate an adjustable connection between the base 280 of the arm and driven end of the drive.

In use for parting stacked upper and lower biscuit sections conveyed to the de-topper, the drive is actuated such that it drives the longitudinal arm in a sweeping motion via the motor and crank or via the linear actuator. In driving the arm with the drive utilizing a crank, the motor rotates the wheel to drive the link in a translational motion. The driving end of the link rotates about the shaft of the motor while the driven end of the link translates in a reciprocating motion in connection with the arm. In driving the arm with a drive utilizing an actuator, the actuator is repeatedly actuated to drive and retrieve the rod, similarly causing the driven end of the actuator rod to translate in a reciprocating motion in connection with the arm. At least the trailing end of the arm thus reciprocates in a sweeping motion about the pivot back and forth across the at least one primary conveying path.

As the stacked upper and lower biscuit sections are conveyed on the at least one primary conveying path towards and past the pivot of the sweeping longitudinal arm, the opposite contact surfaces of the sweeping arm contact the upper sections of the biscuits and sweep them outwardly in a transverse direction from the biscuit' respective lower sections. The upper sections are thus swept from the at least one primary conveying path, over the upper portion of the at least one inner barrier, and onto the respective at least one secondary conveying path.

The at least one inner barrier, having an upper surface that is lower than the separation line of the biscuits, thus prevent the lower sections of the biscuits being swept outwardly in a transverse direction along with the upper section (due to frictional forces present between the upper and lower sections during the sweeping motion). The lower sections of the biscuits, located on the at least one primary conveying path, and the respective upper sections, located on the respective at least one secondary conveying path, are thereafter conveyed away from the longitudinal arm and towards a sandwich assembly area.

While the foregoing description and accompanying drawings are illustrative of the present invention, other variations in structure and method are possible without departing from the invention's spirit and scope.

We claim:

1. A de-topper for parting at least upper and lower sections of stacked products along a separation line comprising:
   an arm;
   at least one primary conveying path for conveying the at least upper and lower sections of the stacked products towards the arm and the lower sections away from the arm; and
   a drive for laterally reciprocating the arm so that the reciprocating arm deposits the upper sections of the stacked products onto at least one secondary conveying path, the at least one secondary conveying path located outwardly of the at least one primary conveying path and conveying the upper sections away from the arm.

2. The de-topper of claim 1 wherein the reciprocating arm is driven to sweep at least a trailing end of the arm across the at least one conveying path for depositing the upper sections of the stacked products onto the at least one secondary conveying path.

3. The de-topper of claim 2 wherein the at least one primary conveying path comprises two primary conveying paths, each primary conveying path having a secondary conveying path of the at least one secondary conveying path located outwardly thereof.

4. The de-topper of claim 3 wherein the reciprocating arm has an adjustable sweep angle.

5. The de-topper of claim 4 wherein the reciprocating arm has an adjustable length.

6. The de-topper of claim 4 wherein the reciprocating arm is removable.

7. The de-topper of claim 1 wherein the drive comprises a crank driven by a motor.

8. The de-topper of claim 1 wherein the drive comprises a linear actuator.

9. A de-topper for parting stacked products along a separation line defining an elevation comprising:
   a longitudinal arm defining leading and trailing ends and a lower portion, the leading end of the arm defining a pivot and the lower portion of the arm located at an elevation at least equal to that of the separation line of the products;
   at least one primary conveying path proximal to at least the leading end of the longitudinal arm;
   at least one inner barrier located along the primary conveying path and defining at least one secondary conveying path, the at least one inner barrier defining an upper portion located at an elevation less than equal to that of the separation line of the products; and
   a drive operably connected to the arm for reciprocating at least the trailing end of the arm about the pivot.

10. The de-topper of claim 9 wherein at least the trailing end of the longitudinal arm is driven in a sweeping motion across the at least one conveying path.

11. The de-topper of claim 10 wherein the longitudinal arm has an adjustable sweep angle.

12. The de-topper of claim 11 wherein the longitudinal arm has an adjustable length.

13. The de-topper of claim 11 wherein the longitudinal arm is removably connected to the pivot.

14. The de-topper of claim 9 wherein the at least one primary conveying path comprises two primary conveying paths and wherein the at least one inner barrier comprises two inner barriers to define two secondary conveying paths of the at least one secondary conveying path, the two secondary conveying paths located respectively outwardly of the two primary conveying paths and the pivot of the longitudinal arm centrally located between the two primary paths.

15. The de-topper of claim 14 wherein at least the trailing end of the longitudinal arm is driven in a sweeping motion across the two primary conveying paths.

16. The de-topper of claim 15 wherein the longitudinal arm has a sweep angle for each of the two primary paths of from about 5 degrees to about 90 degrees.

17. The de-topper of claim 15 wherein the longitudinal arm has a sweep angle for each of the two primary paths of from about 10 degrees to about 45 degrees.

18. The de-topper of claim 15 wherein the longitudinal arm has a sweep angle for each of the two primary paths of from about 15 degrees to about 35 degrees.

19. The de-topper of claim 9 wherein the drive comprises a crank driven by a motor.

20. The de-topper of claim 9 wherein the drive comprises a linear actuator.

21. A de-topper for parting stacked products having at least upper and lower sections along a separation line defining an elevation comprising:
a longitudinal arm defining leading and trailing ends and a lower portion, the leading end of the arm defining a pivot and the lower portion of the arm located at an elevation at least equal to that of the separation line of the products;
two primary conveying paths in parallel relation with one another leading towards and past the longitudinal arm, the pivot of the longitudinal arm centrally located between the two primary paths;
two inner barriers located respectively along the two primary conveying paths and defining two secondary conveying paths, the two secondary conveying paths in parallel relation with and located outwardly of the two primary conveying paths, the inner barriers each defining an upper portion located at an elevation less than equal to that of the separation line of the products; and
a drive operably connected to the arm for reciprocating at least the trailing end of the arm back and forth across the two primary conveying paths, the arm thereby sweeping the upper sections of the stacked products from the lower sections and placing the upper sections onto the secondary conveying paths, the inner barriers preventing the lower sections from being swept onto the secondary conveying paths along with the upper sections.

22. The de-topper of claim 21 wherein the longitudinal arm has an adjustable sweep angle.

23. The de-topper of claim 22 wherein the longitudinal arm has an adjustable length.

24. The de-topper of claim 22 wherein the longitudinal arm is removably connected to the pivot.

25. A method for parting stacked products having upper and lower sections comprising:
conveying the stacked products having the upper and lower sections on at least one primary conveying path towards a longitudinal arm;
reciprocating the longitudinal arm in a sweeping motion to contact the upper sections of the stacked products and place the upper sections onto at least one secondary conveying path; and
conveying the lower and upper sections on the respective primary and secondary conveying paths away from the longitudinal arm.

26. The method of claim 25 wherein an inner barrier is located along the at least one primary conveying path, the longitudinal arm sweeping the upper sections of the stacked products outwardly from the lower sections, over the inner barrier and onto the at least one secondary conveying path, the inner barrier preventing the lower sections from being swept outwardly by the longitudinal arm.

27. The method of claim 25 wherein the longitudinal arm is reciprocated by a crank driven by a motor.

28. The method of claim 25 wherein the longitudinal arm is reciprocated by a linear actuator.

\* \* \* \* \*